(12) United States Patent
Levine

(10) Patent No.: US 8,629,576 B2
(45) Date of Patent: Jan. 14, 2014

(54) TUNING AND GAIN CONTROL IN ELECTRO-MAGNETIC POWER SYSTEMS

(75) Inventor: Richard C. Levine, Dallas, TX (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 12/058,624

(22) Filed: Mar. 28, 2008

(65) Prior Publication Data

US 2009/0243394 A1    Oct. 1, 2009

(51) Int. Cl.
  *H01F 27/42*  (2006.01)
  *H01F 37/00*  (2006.01)
  *H01F 38/00*  (2006.01)
(52) U.S. Cl.
  USPC .......................................................... 307/104
(58) Field of Classification Search
  USPC .................................. 307/104, 149; 320/108
  See application file for complete search history.

(56) References Cited

U.S. PATENT DOCUMENTS

| | | | |
|---|---|---|---|
| 3,098,971 A | 7/1963 | Richardson | |
| 3,480,229 A | 11/1969 | Entremont | |
| 3,588,905 A | 6/1971 | Dunlavy, Jr. | |
| 3,675,108 A | 7/1972 | Nicholl | |
| 3,918,062 A | 11/1975 | Haruki et al. | |
| 3,938,018 A | 2/1976 | Dahl | |
| 3,999,185 A | 12/1976 | Polgar, Jr. et al. | |
| 4,088,999 A | 5/1978 | Fletcher et al. | |
| 4,388,524 A | 6/1983 | Walton | |
| 4,390,924 A | 6/1983 | Nebiker, Jr. | |
| 4,473,825 A | 9/1984 | Walton | |
| 4,524,411 A | 6/1985 | Willis | |
| 4,760,394 A | 7/1988 | Takeuchi et al. | |
| 4,914,539 A | 4/1990 | Turner et al. | |
| 4,959,568 A | 9/1990 | Stokes | |
| 4,959,764 A | 9/1990 | Bassett | |
| 5,027,709 A | 7/1991 | Slagle | |
| 5,072,233 A | 12/1991 | Zanzig | |
| 5,153,583 A | 10/1992 | Murdoch | |
| 5,175,561 A | 12/1992 | Goto | |
| 5,387,818 A | 2/1995 | Leibowitz | |
| 5,396,538 A | 3/1995 | Hong | |
| 5,397,962 A | 3/1995 | Moslehi | |
| 5,438,699 A | 8/1995 | Coveley | |
| 5,450,305 A | 9/1995 | Boys et al. | |
| 5,455,466 A | 10/1995 | Parks et al. | |
| 5,491,715 A | 2/1996 | Flaxl | |
| 5,519,262 A | 5/1996 | Wood | |
| 5,596,567 A | 1/1997 | DeMuro et al. | |

(Continued)

FOREIGN PATENT DOCUMENTS

| | | |
|---|---|---|
| CN | 1202025 A | 12/1998 |
| CN | 1231069 A | 10/1999 |

(Continued)

OTHER PUBLICATIONS

"Wireless Non-Radiative Energy Transfer", MIT paper, publication and date unknown, believed to be 2007.

(Continued)

*Primary Examiner* — Carlos Amaya
(74) *Attorney, Agent, or Firm* — Knobbe Martens Olson & Bear LLP

(57) ABSTRACT

Tuning and gain control as described for magnetic power systems, including different ways to change the characteristic of transmission and reception.

40 Claims, 1 Drawing Sheet

(56) References Cited

U.S. PATENT DOCUMENTS

| | | |
|---|---|---|
| 5,608,417 A | 3/1997 | De Vall |
| 5,621,322 A | 4/1997 | Ehnholm |
| 5,654,621 A | 8/1997 | Seelig |
| 5,684,828 A | 11/1997 | Bolan et al. |
| 5,701,121 A | 12/1997 | Murdoch |
| 5,734,255 A | 3/1998 | Thompson et al. |
| 5,767,601 A | 6/1998 | Uchiyama |
| 5,771,165 A | 6/1998 | Couture et al. |
| 5,796,240 A | 8/1998 | Saito et al. |
| 5,821,638 A | 10/1998 | Boys et al. |
| 5,856,710 A | 1/1999 | Baughman et al. |
| 5,936,575 A | 8/1999 | Azzarelli et al. |
| 5,963,012 A | 10/1999 | Garcia et al. |
| 5,966,941 A | 10/1999 | Ghoshal |
| 5,975,714 A | 11/1999 | Vetorino et al. |
| 5,982,139 A | 11/1999 | Parise |
| 5,991,665 A | 11/1999 | Wang et al. |
| 6,016,046 A | 1/2000 | Kaite et al. |
| 6,028,413 A | 2/2000 | Brockmann |
| 6,031,708 A | 2/2000 | Guermeur |
| 6,040,680 A | 3/2000 | Toya et al. |
| 6,040,986 A | 3/2000 | Sakamoto et al. |
| 6,104,354 A | 8/2000 | Hill et al. |
| 6,114,834 A | 9/2000 | Parise |
| 6,127,799 A | 10/2000 | Krishnan |
| 6,175,124 B1 | 1/2001 | Cole et al. |
| 6,184,651 B1 | 2/2001 | Fernandez et al. |
| 6,265,789 B1 | 7/2001 | Honda et al. |
| 6,275,681 B1 | 8/2001 | Vega et al. |
| 6,291,901 B1 | 9/2001 | Cefo |
| 6,317,338 B1 | 11/2001 | Boys |
| 6,321,067 B1 | 11/2001 | Suga et al. |
| 6,337,628 B2 | 1/2002 | Campana, Jr. |
| 6,341,076 B1 | 1/2002 | Kadatskyy et al. |
| 6,411,824 B1 | 6/2002 | Eidson |
| 6,437,685 B2 | 8/2002 | Hanaki |
| 6,507,152 B2 | 1/2003 | Matsumoto et al. |
| 6,523,493 B1 | 2/2003 | Brcka |
| 6,556,054 B1 | 4/2003 | Goodman et al. |
| 6,633,026 B2 | 10/2003 | Tuominen |
| 6,636,146 B1 | 10/2003 | Wehoski |
| 6,670,864 B2 | 12/2003 | Hyvonen et al. |
| 6,798,716 B1 | 9/2004 | Charych |
| 6,803,744 B1 | 10/2004 | Sabo |
| 6,879,076 B2 | 4/2005 | Long |
| 6,891,287 B2 | 5/2005 | Moret |
| 6,912,137 B2 | 6/2005 | Berghegger |
| 6,960,968 B2 | 11/2005 | Odendaal et al. |
| 6,965,352 B2 | 11/2005 | Ohara et al. |
| 6,967,462 B1 | 11/2005 | Landis |
| 6,972,542 B2 | 12/2005 | Patino et al. |
| 6,972,543 B1 | 12/2005 | Wells |
| 7,012,405 B2 | 3/2006 | Nishida et al. |
| 7,068,991 B2* | 6/2006 | Parise ..................... 455/343.1 |
| 7,076,206 B2 | 7/2006 | Elferich et al. |
| 7,095,301 B2 | 8/2006 | Hidaka et al. |
| 7,110,462 B2 | 9/2006 | Monsen |
| 7,116,018 B2 | 10/2006 | Strobl |
| 7,154,451 B1 | 12/2006 | Sievenpiper |
| 7,164,344 B2 | 1/2007 | Deguchi et al. |
| 7,167,139 B2 | 1/2007 | Kim et al. |
| 7,180,265 B2 | 2/2007 | Naskali et al. |
| 7,180,291 B2 | 2/2007 | Chmielewski et al. |
| 7,209,792 B1 | 4/2007 | Parramon et al. |
| 7,212,414 B2 | 5/2007 | Baarman |
| 7,215,061 B2 | 5/2007 | Kihara et al. |
| 7,248,165 B2 | 7/2007 | Collins et al. |
| 7,256,532 B2 | 8/2007 | Viehland et al. |
| 7,262,701 B1 | 8/2007 | Nguyen |
| 7,380,150 B2 | 5/2008 | Meier et al. |
| 7,423,518 B2 | 9/2008 | Yamada |
| 7,511,500 B2 | 3/2009 | Schiano et al. |
| 7,518,267 B2 | 4/2009 | Baarman |
| 7,525,283 B2 | 4/2009 | Cheng et al. |
| 7,554,316 B2 | 6/2009 | Stevens et al. |
| 7,598,646 B2 | 10/2009 | Cleveland |
| 7,675,197 B2 | 3/2010 | Tetlow |
| 7,676,263 B2 | 3/2010 | Harris et al. |
| 7,688,036 B2 | 3/2010 | Yarger et al. |
| 7,755,552 B2 | 7/2010 | Schantz et al. |
| 7,760,151 B2 | 7/2010 | Poilasne et al. |
| 7,777,396 B2 | 8/2010 | Rastegar et al. |
| 7,825,543 B2 | 11/2010 | Karalis et al. |
| 7,839,124 B2 | 11/2010 | Yamazaki et al. |
| 7,844,306 B2 | 11/2010 | Shearer et al. |
| 7,868,482 B2 | 1/2011 | Greene et al. |
| 7,885,050 B2 | 2/2011 | Lee |
| 8,055,310 B2 | 11/2011 | Beart et al. |
| 8,159,412 B2 | 4/2012 | Yun et al. |
| 8,169,185 B2 | 5/2012 | Partovi et al. |
| 2001/0012208 A1 | 8/2001 | Boys |
| 2001/0026244 A1 | 10/2001 | Ieda et al. |
| 2001/0029167 A1 | 10/2001 | Takeda et al. |
| 2002/0017979 A1 | 2/2002 | Krause et al. |
| 2002/0036977 A1 | 3/2002 | Lenssen et al. |
| 2002/0057161 A1 | 5/2002 | Katsura et al. |
| 2002/0057584 A1 | 5/2002 | Brockmann |
| 2002/0160722 A1 | 10/2002 | Terranova et al. |
| 2002/0180584 A1 | 12/2002 | McGregor et al. |
| 2002/0190908 A1 | 12/2002 | Andrews et al. |
| 2003/0090353 A1 | 5/2003 | Robinson et al. |
| 2003/0144031 A1 | 7/2003 | Ono et al. |
| 2003/0162566 A1 | 8/2003 | Shapira et al. |
| 2003/0174099 A1 | 9/2003 | Bauer et al. |
| 2003/0193438 A1 | 10/2003 | Yoon |
| 2003/0199778 A1 | 10/2003 | Mickle et al. |
| 2003/0203733 A1 | 10/2003 | Sharon |
| 2003/0214961 A1 | 11/2003 | Nevo et al. |
| 2004/0001029 A1 | 1/2004 | Parsche et al. |
| 2004/0002835 A1 | 1/2004 | Nelson |
| 2004/0130425 A1* | 7/2004 | Dayan et al. ................. 336/200 |
| 2004/0150521 A1 | 8/2004 | Stilp |
| 2004/0160323 A1 | 8/2004 | Stilp |
| 2004/0204781 A1 | 10/2004 | Hsien |
| 2004/0212500 A1 | 10/2004 | Stilp |
| 2004/0227002 A1 | 11/2004 | Watanabe |
| 2004/0227057 A1 | 11/2004 | Tuominen et al. |
| 2004/0227619 A1 | 11/2004 | Watanabe |
| 2005/0007239 A1 | 1/2005 | Woodard et al. |
| 2005/0017677 A1 | 1/2005 | Burton et al. |
| 2005/0029351 A1 | 2/2005 | Yoshinaga et al. |
| 2005/0043055 A1 | 2/2005 | Vance |
| 2005/0057422 A1 | 3/2005 | Deguchi et al. |
| 2005/0075697 A1 | 4/2005 | Olson et al. |
| 2005/0104457 A1 | 5/2005 | Jordan et al. |
| 2005/0125093 A1 | 6/2005 | Kikuchi et al. |
| 2005/0127867 A1 | 6/2005 | Calhoon et al. ............... 320/108 |
| 2005/0131495 A1 | 6/2005 | Parramon et al. ............... 607/61 |
| 2005/0194926 A1 | 9/2005 | Di Stefano |
| 2005/0273143 A1 | 12/2005 | Kanzius et al. |
| 2006/0017438 A1 | 1/2006 | Mullen et al. |
| 2006/0061325 A1 | 3/2006 | Tang et al. |
| 2006/0071790 A1 | 4/2006 | Duron et al. |
| 2006/0094449 A1 | 5/2006 | Goldberg |
| 2006/0103355 A1 | 5/2006 | Patino et al. |
| 2006/0113955 A1 | 6/2006 | Nunally |
| 2006/0121639 A1 | 6/2006 | Tai et al. |
| 2006/0125703 A1 | 6/2006 | Ma et al. |
| 2006/0145659 A1 | 7/2006 | Patino et al. |
| 2006/0145660 A1 | 7/2006 | Black et al. |
| 2006/0159536 A1 | 7/2006 | Pu |
| 2006/0160517 A1 | 7/2006 | Yoon |
| 2006/0164312 A1 | 7/2006 | Mathieu |
| 2006/0208903 A1 | 9/2006 | Loh et al. |
| 2006/0239043 A1 | 10/2006 | Ohbo |
| 2006/0273756 A1 | 12/2006 | Bowling et al. |
| 2007/0010295 A1 | 1/2007 | Greene et al. |
| 2007/0029965 A1 | 2/2007 | Hui et al. |
| 2007/0046433 A1 | 3/2007 | Mukherjee |
| 2007/0054705 A1 | 3/2007 | Liow et al. |
| 2007/0060221 A1 | 3/2007 | Burgan et al. |
| 2007/0082611 A1 | 4/2007 | Terranova et al. |
| 2007/0091006 A1 | 4/2007 | Thober et al. |
| 2007/0096910 A1 | 5/2007 | Waters |

(56) References Cited

U.S. PATENT DOCUMENTS

| | | |
|---|---|---|
| 2007/0103110 A1 | 5/2007 | Sagoo et al. |
| 2007/0103291 A1 | 5/2007 | Adams |
| 2007/0105524 A1 | 5/2007 | Fullam et al. |
| 2007/0114945 A1 | 5/2007 | Mattaboni et al. |
| 2007/0120678 A1 | 5/2007 | Posamentier |
| 2007/0126395 A1 | 6/2007 | Suchar |
| 2007/0126650 A1 | 6/2007 | Guenther |
| 2007/0135078 A1 | 6/2007 | Ljung |
| 2007/0139000 A1 | 6/2007 | Kozuma et al. |
| 2007/0145830 A1 | 6/2007 | Lee et al. |
| 2007/0146218 A1 | 6/2007 | Turner et al. |
| 2007/0156204 A1 | 7/2007 | Denker et al. |
| 2007/0164414 A1 | 7/2007 | Dokai et al. |
| 2007/0171681 A1 | 7/2007 | Baarman |
| 2007/0178945 A1 | 8/2007 | Cook et al. |
| 2007/0188326 A1 | 8/2007 | Pluss et al. |
| 2007/0205881 A1 | 9/2007 | Breed |
| 2007/0214940 A1 | 9/2007 | Stoneback |
| 2007/0222542 A1 | 9/2007 | Joannopoulos |
| 2007/0281625 A1 | 12/2007 | Boys |
| 2007/0285819 A1 | 12/2007 | Gerhardinger |
| 2007/0296393 A1 | 12/2007 | Malpas et al. |
| 2007/0296548 A1 | 12/2007 | Hall et al. |
| 2007/0298846 A1 | 12/2007 | Greene et al. |
| 2008/0003963 A1 | 1/2008 | Turner |
| 2008/0014897 A1 | 1/2008 | Cook et al. |
| 2008/0054638 A1 | 3/2008 | Greene et al. |
| 2008/0067874 A1 | 3/2008 | Tseng |
| 2008/0093934 A1 | 4/2008 | Kato |
| 2008/0108862 A1 | 5/2008 | Jordan et al. |
| 2008/0122294 A1 | 5/2008 | Simon et al. |
| 2008/0122297 A1 | 5/2008 | Arai |
| 2008/0129147 A1 | 6/2008 | Thiesen et al. |
| 2008/0167755 A1 | 7/2008 | Curt |
| 2008/0186129 A1 | 8/2008 | Fitzgibbon |
| 2008/0191897 A1 | 8/2008 | McCollough ............ 340/625.22 |
| 2008/0211320 A1 | 9/2008 | Cook et al. |
| 2008/0211455 A1 | 9/2008 | Park et al. |
| 2008/0225564 A1 | 9/2008 | Bohm et al. |
| 2008/0293446 A1 | 11/2008 | Rofougaran et al. |
| 2008/0296978 A1 | 12/2008 | Finkenzeller et al. |
| 2008/0309452 A1 | 12/2008 | Zeine |
| 2009/0002175 A1 | 1/2009 | Waters |
| 2009/0009177 A1 | 1/2009 | Kim et al. |
| 2009/0026907 A1 | 1/2009 | Davidowitz et al. |
| 2009/0045772 A1 | 2/2009 | Cook et al. |
| 2009/0051224 A1 | 2/2009 | Cook et al. |
| 2009/0052721 A1 | 2/2009 | Dabrowski |
| 2009/0058361 A1 | 3/2009 | John |
| 2009/0072627 A1 | 3/2009 | Cook et al. |
| 2009/0079268 A1 | 3/2009 | Cook et al. |
| 2009/0102296 A1 | 4/2009 | Greene et al. |
| 2009/0102419 A1 | 4/2009 | Gwon et al. |
| 2009/0109102 A1 | 4/2009 | Dokai et al. |
| 2009/0111531 A1 | 4/2009 | Cui et al. |
| 2009/0121713 A1 | 5/2009 | Van Helvoort |
| 2009/0127937 A1 | 5/2009 | Widmer et al. |
| 2009/0146892 A1 | 6/2009 | Shimizu et al. |
| 2009/0167449 A1 | 7/2009 | Cook et al. |
| 2009/0204170 A1 | 8/2009 | Hastings et al. |
| 2009/0218884 A1 | 9/2009 | Soar |
| 2009/0243394 A1 | 10/2009 | Levine |
| 2009/0273242 A1 | 11/2009 | Cook |
| 2009/0299918 A1 | 12/2009 | Cook et al. |
| 2009/0308933 A1 | 12/2009 | Osada |
| 2010/0013434 A1 | 1/2010 | Taylor-Haw et al. |
| 2010/0068998 A1 | 3/2010 | Zyambo et al. |
| 2010/0109445 A1 | 5/2010 | Kurs et al. |
| 2010/0134366 A1 | 6/2010 | Yu |
| 2010/0176936 A1 | 7/2010 | Garber et al. |
| 2010/0277387 A1 | 11/2010 | Schantz et al. |
| 2010/0289331 A1 | 11/2010 | Shionoiri et al. |
| 2010/0289449 A1 | 11/2010 | Elo |
| 2010/0315045 A1 | 12/2010 | Zeine |
| 2011/0031821 A1 | 2/2011 | Greene et al. |
| 2011/0050166 A1 | 3/2011 | Cook et al. |
| 2011/0069516 A1 | 3/2011 | Greene et al. |
| 2011/0074349 A1 | 3/2011 | Ghovanloo |

FOREIGN PATENT DOCUMENTS

| | | |
|---|---|---|
| CN | 1237009 A | 12/1999 |
| CN | 2582188 Y | 10/2003 |
| DE | 4023412 | 2/1992 |
| DE | 19509918 | 9/1996 |
| DE | 19729722 | 1/1999 |
| DE | 19938460 | 2/2001 |
| DE | 102004009896 | 9/2005 |
| DE | 102005053111 | 5/2007 |
| EP | 0568920 | 11/1993 |
| EP | 298707 | 9/1994 |
| EP | 724308 | 7/1996 |
| EP | 773509 | 4/2002 |
| EP | 1211776 | 6/2002 |
| EP | 1233547 A1 | 8/2002 |
| EP | 1302822 | 4/2003 |
| EP | 1315051 | 5/2003 |
| EP | 1003266 | 4/2006 |
| EP | 1413975 | 5/2007 |
| EP | 1892799 | 2/2008 |
| GB | 1280516 | 7/1972 |
| GB | 1343071 | 1/1974 |
| GB | 2070298 | 9/1981 |
| GB | 2318696 | 4/1998 |
| JP | S55133106 A | 10/1980 |
| JP | 57032144 | 2/1982 |
| JP | 62071430 A | 4/1987 |
| JP | 1298901 A | 12/1989 |
| JP | H037034 A | 1/1991 |
| JP | 4115606 A | 4/1992 |
| JP | H04112635 A | 4/1992 |
| JP | 04271201 | 9/1992 |
| JP | 5038232 A | 2/1993 |
| JP | 05183318 | 7/1993 |
| JP | 6044207 A | 2/1994 |
| JP | 06133476 | 5/1994 |
| JP | 6044207 U | 6/1994 |
| JP | 6303726 | 10/1994 |
| JP | 6327172 A | 11/1994 |
| JP | 6339232 | 12/1994 |
| JP | 8033244 A | 2/1996 |
| JP | 8079976 | 3/1996 |
| JP | 8088942 | 4/1996 |
| JP | H08103039 A | 4/1996 |
| JP | 8130840 A | 5/1996 |
| JP | 08162689 A | 6/1996 |
| JP | 09037475 | 2/1997 |
| JP | 9182322 | 7/1997 |
| JP | 10097931 | 4/1998 |
| JP | 10145987 A | 5/1998 |
| JP | 10225020 | 8/1998 |
| JP | H1155878 A | 2/1999 |
| JP | 11143600 | 5/1999 |
| JP | 11188113 A | 7/1999 |
| JP | 11191146 | 7/1999 |
| JP | 11215802 A | 8/1999 |
| JP | H11220813 A | 8/1999 |
| JP | 11332135 | 11/1999 |
| JP | H11308033 A | 11/1999 |
| JP | 2000078763 | 3/2000 |
| JP | 2000175379 | 6/2000 |
| JP | 2000217279 | 8/2000 |
| JP | 2000285214 A | 10/2000 |
| JP | 2001024548 A | 1/2001 |
| JP | 2001197672 | 7/2001 |
| JP | 2001238372 A | 8/2001 |
| JP | 2001264432 A | 9/2001 |
| JP | 2001526374 A | 12/2001 |
| JP | 2002017058 A | 1/2002 |
| JP | 2002078247 A | 3/2002 |
| JP | 2002508916 A | 3/2002 |
| JP | 2002152191 A | 5/2002 |
| JP | 2002320347 | 10/2002 |
| JP | 2003047177 A | 2/2003 |

(56) References Cited

FOREIGN PATENT DOCUMENTS

| | | |
|---|---|---|
| JP | 2003069335 A | 3/2003 |
| JP | 2003189507 A | 7/2003 |
| JP | 2004187429 A | 7/2004 |
| JP | 2005039756 A | 2/2005 |
| JP | 2005045298 A | 2/2005 |
| JP | 2005137040 | 5/2005 |
| JP | 2005261187 A | 9/2005 |
| JP | 2006042519 | 2/2006 |
| JP | 2006510101 A | 3/2006 |
| JP | 2006115592 A | 4/2006 |
| JP | 2006149163 A | 6/2006 |
| JP | 2007060829 A | 3/2007 |
| JP | 2007129658 A | 5/2007 |
| JP | 2008508842 A | 3/2008 |
| JP | 2009501510 A | 1/2009 |
| JP | 2010539821 A | 12/2010 |
| KR | 102004017058 | 3/2000 |
| KR | 1020010000674 | 1/2001 |
| KR | 1020010030472 | 4/2001 |
| KR | 20020064451 A | 8/2002 |
| KR | 20050016879 A | 2/2005 |
| KR | 1020050019926 | 3/2005 |
| KR | 20060070795 A | 6/2006 |
| KR | 20070017804 A | 2/2007 |
| KR | 20070048071 A | 5/2007 |
| WO | WO8807732 | 10/1988 |
| WO | 9323908 A1 | 11/1993 |
| WO | WO9619028 | 6/1996 |
| WO | 9850993 A1 | 11/1998 |
| WO | WO9857413 A1 | 12/1998 |
| WO | WO9930090 A1 | 6/1999 |
| WO | WO9950780 | 10/1999 |
| WO | WO9950806 | 10/1999 |
| WO | WO0054387 | 9/2000 |
| WO | WO0167413 | 9/2001 |
| WO | WO02060215 | 8/2002 |
| WO | WO03077364 A2 | 9/2003 |
| WO | WO03105308 | 12/2003 |
| WO | WO2004038887 | 5/2004 |
| WO | WO2004052563 | 6/2004 |
| WO | WO2004073166 | 8/2004 |
| WO | WO2004077550 | 9/2004 |
| WO | WO2005086279 | 9/2005 |
| WO | WO2006006636 A1 | 1/2006 |
| WO | WO2006011769 A1 | 2/2006 |
| WO | WO2006031785 | 3/2006 |
| WO | WO2007008646 A2 | 1/2007 |
| WO | WO2007048052 | 4/2007 |
| WO | WO2007077442 | 7/2007 |
| WO | WO2007083574 A1 | 7/2007 |
| WO | WO2008012702 | 1/2008 |

OTHER PUBLICATIONS

"Efficient wireless non-radiative mid-range energy transfer", MITpaper, publication and date unknown, believed to be 2007.
"Wireless Power Transfer via Strongly Coupled Magnetic Resonances", Kurs et al, Science Express, Jun. 7, 2007.
"Wireless Power Transfer via Strongly Coupled Magnetic Resonances", Kurs et al, scimag.org, Jul. 6, 2007.
Harrist, Wireless battery charging system using radio frequency energy harvesting, Master of Science Thesis, University of Pittsburgh, 2004.
Ozawa, R., et al., "Wireless Energy Transmission for Micro Aerial Vehicles Using a Microwave Phased Array," 3rd International Energy Conversion Engineering Conference, Aug. 15-18, 2005, San Francisco, CA, pp. 1-6.
Chunbo et al., "Research on the topology of wireless energy transfer device", Sch. of Electr. Eng. & Autom., Harbin Inst. of Technol., Harbin This paper appears in: Vehicle Power and Propulsion Conference, 2008. VPPC '08. IEEE Issue Date : Sep. 3-5, 2008 On p. 1 Print ISBN: 978-1-4244-1848-0 INSPEC Accession No. 10394615 Digital Object Identifier : 10.1109/VPPC.2008.4677798 Date of Current Version : Nov. 18, 2008.
Karalis et al., "Efficient wireless no-rediative mid-range energy transfer", Science Direct, Annals of Physics, 323(1),34-48.(Jan. 2008). doi:10.1016/j.aop.2007.04.017.
Kim et al., "Electrically Small Magnetic Dipole Antennas With Quality Factors Approaching the Chu Lower Bound", Antennas and Propagation, IEEE Transactions on vol. 58 Issue: 6 Publication Date: Jun. 2010 pp. 1898-1906 Digital Object Identifier: 10.1109/TAP. 2010.2046864.
Miranda et al.,"Wireless power transfer using weakly coupled magnetostatic resonators", Energy Conversion Congress and Exposition (ECCE), 2010 IEEE Digital Object Identifier: 10.1109/ECCE. 2010.5617728 Publication Year: 2010 , pp. 4179-4186 IEEE Conferences.
Yates et al., "Optimal transmission frequency for ultralow-power short-range radio links", Source: IEEE Transactions on Circuits and Systems I: Fundamental Theory and Applications, v 51, n. 7, 1405-13, Jul. 2004; ISSN: 1057-7122; DOI: 10.1109/TCSI.2004.830696; Publisher: IEEE, USA Author affiliation: Dept. of Electr. & Electron. Eng., Imperial Coll. London, UK.
Dong-Gi Youn et al., "A Study on the Fundamental Transmission Experiment for Wireless Power Transmission System," 1999 IEEE Conference, TENCON 99, vol. 2, pp. 1419-1422, Sep. 1999.
Finkenzeller, "RFID Handbook: Fundamentals and Applications in Contactless Smart Cards and Identification," Second Edition, Translated by Rachel Waddington, 2003, John Wiley & Sons Ltd., pp. 106-111.
McSpadden et al., "A High Conversion Efficiency 5.8 GHz Rectenna," 1997 IEEE Microwave Symposium, vol. 2, pp. 547-550, Jun. 1997.
McSpadden et al., "Theoretical and Experimental Investigation of a Rectenna Element for Microwave Power Transmission," 1992 IEEE Transactions on Microwave Theory and Techniques, vol. 40, pp. 2359-2366, Dec. 1992.
Kim et al., Switchable polymer-based thin film coils as a power module wireless neural interfaces, Sensors and Actuators, vol. A 136, Issue 1, May 2007 (available online Nov. 27, 2006), pp. 467-474.
Kurs et al., "Wireless Power Transfer via Strongly Coupled Magnetic Resonances", scimag.org, Jul. 6, 2007.
Myers et al., "A transcutaneous power transformer," Trans. Amer. Soc. Artif. Inter. Organs, vol. 14, 1968, pp. 210-219.
Shinohara et al., "Experimental Study of Large Rectenna Array for Microwave Energy Transmission," 1998 IEEE Transactions on Microwave Theory and Techniques, vol. 46, pp. 261-268, Mar. 1998.
Onizuka et al., A design methodology of chip-to-chip wireless power transmission system, Univ. of Tokyo, International Conference on Integrated Circuit Design and Technology, 2007 (ICICDT '07), IEEE, May-Jun. 2007, pp. 1-4.
Schuder et al., "High Level electromagnetic energy transfer through a closed wall", Inst.Radio Engrs. Int.Conf Record 9, pp. 119-126, 1961.
Schuder, "Powering an artificial heart:Birth of the inductively coupled-radio frequency system in 1960", Artificial organs , vol. 26, No. 11, 2002, pp. 909-915.
Tae-Whan Yoo et al., "Theoretical and Experimental Development of 10 and 35 GHz Rectennas," 1992 IEEE Transactions on Microwave Theory and Techniques, vol. 40, pp. 1259-1266, Jun. 1992.
Sekitani et al., "A Large-area Wireless Power-Transmission Sheet Using Printed Organic Transistors and Plastic MEMS Switches," Nature Materials Letter, pp. 413-417; Jan. 2007.
Dudek, et al., "High permeability micro-magneto-mechanical systems," International Journal of Applied Electromagnetics and Mechanics (2007), vol. 25, pp. 103-108.
Bayrashev, Andrey, et al., "Low frequency wireless powering of microsystems using piezoelectric-magnetostrictive laminate composites," Sensors & Actuators A: Physical, Sep. 2004, vol. 114, Issue 2/3, pp. 244-249.

\* cited by examiner

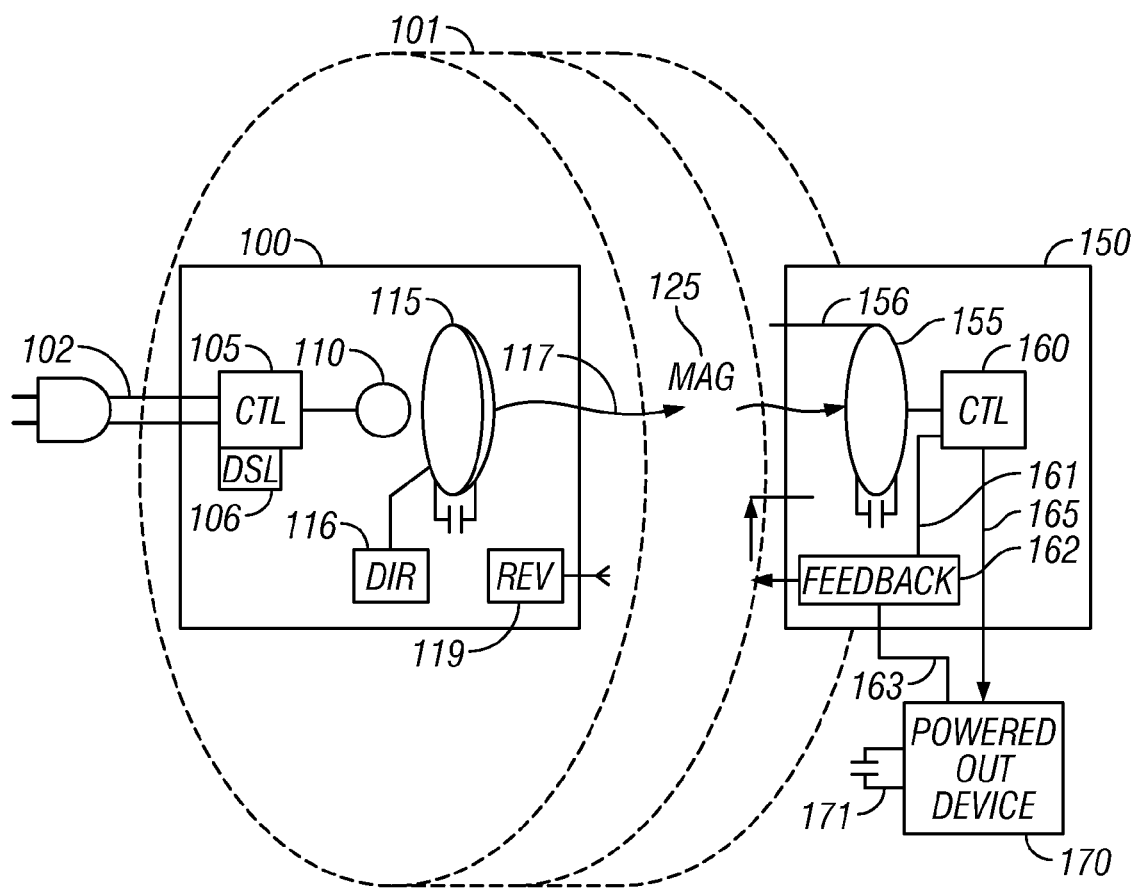

TUNING AND GAIN CONTROL IN ELECTRO-MAGNETIC POWER SYSTEMS

BACKGROUND

Our previous applications and provisional applications, including, but not limited to, U.S. patent application Ser. No. 12/018,069, filed Jan. 22, 2008, entitled "Wireless Apparatus and Methods", the disclosure of which is herewith incorporated by reference, describe wireless transfer of power.

The transmit and receiving antennas described here are operated at frequencies exactly equal to or close to their resonance. The receive antenna is preferably of a small size to allow it to fit into a mobile, handheld device where the available space for the antenna may be limited. An embodiment describes a high efficiency antenna for the specific characteristics and environment for the power being transmitted and received.

One embodiment may be usable in a configuration that transfers power between two antennas by means of the intermediate portions of space, by storing all or part of the energy in the near field of the transmitting antenna, rather than sending the energy into free space in the form of a travelling electromagnetic wave.

Embodiments operate with high quality factor (Q) antennas.

In one embodiment, two high-Q antennas are placed such that they receive power similarly to a loosely coupled transformer, with one antenna inducing power into the other. The antennas preferably have Qs that are greater than 1000.

SUMMARY

The present application describes a number of improvements for an electromagnetic power transfer system, with emphasis on embodiments that deliver the majority of the power via the magnetic field. Embodiments which deliver the power substantially via the electric field, or via both the electric and magnetic field(s), are included in the scope of this disclosure.

An aspect describes adaptive beam steering

BRIEF DESCRIPTION OF THE DRAWINGS

FIG. 1 shows a block diagram of the overall system.

DETAILED DESCRIPTION

A basic block diagram of an embodiment is shown in FIG. 1. A transmitter 100 is located spaced from a receiver 150 across a spacing 101. The spacing typically comprises an area or volume of air, a wall, or any other separating medium. Importantly, the connection between the transmitter and receiver is wireless—in the sense that the power delivery is effected without an electrically conductive wire connecting between the transmitter and receiver. The receiver receives power via a wireless transmission. That received power is coupled to a load.

In an exemplary embodiment, the transmitter 100 comprises an electric plug 102 that plugs into an electric outlet, a power source. The electric outlet typically furnishes alternating current (ac) having a sinusoidal voltage waveform with a frequency of either 50 or 60 Hz and a root-mean-square (RMS) voltage of nominally either 220 or 120 volts, respectively. The transmitter is typically constructed of at least two modules whose technology is well known to those of ordinary skill in the art: A so-called "power supply" (more precisely a power waveform converter) which produces an internal intermediate power waveform (typically uniform direct current—dc), and an oscillator having adjustable amplitude, frequency and phase for a sinusoidal waveform. In addition to these two modules, a control unit 105 controls characteristics of the transmitting, including changing the frequency of the electric signal, turning it on and off, and carrying out various features as described in these embodiments. The signal is coupled to a coupling loop 110, which induces transmitted power into a resonant antenna 115. Antenna 115 may optionally further utilize a connection of an inductor and/or capacitor forming a resonant LC circuit. This produces a magnetic field across an area, the magnetic field shown generally at 125.

An exemplary magnetic field receiver circuit is also shown and is formed of a receiving antenna which couples to a receiver controlling circuit 160. Receiver controlling circuit 160 may carry out various aspects of control as described herein by receiving the magnetic field signal, sensing various parameters of the received signal, and rectifying an output signal to produce a power output 165 to a load 170.

The overall efficiency of this kind of system may be measured as the ratio of the power delivered to the power transmitted. An embodiment describes increasing the efficiency of this system via the optional use of a feedback control in an embodiment. The feedback control determines characteristics of the power coupling, and optimizes parameters to improve the power coupling.

The automatic feedback control may optimize the directionality and hence the concentration of the electromagnetic field onto the space in and immediately around the receiver 150.

For example, FIG. 1 shows how the magnetic field 125 may be concentrated in the immediate neighborhood and interior of the receive antenna or coil 155. Any magnetic field that is outside this immediate space 156 is in essence wasted. This is overspray power that goes in other directions. Directing the power to the spatial region 156 minimizes the amount of the wasted power. This in turn increases the percentage of the power that is received and used by the receiver, and hence this can improve the efficiency of this system.

An exemplary embodiment discloses "sniffing" the power location and/or distribution, to determine parameter values leading to optimum power delivery, and to optimize the spatial pattern of the power delivery.

A first optimization may optimize the transmission according to an output variable. The output variable may be dependent on the optimal setting of scalar or vector parameters such as signal phase or beam direction, respectively.

A first embodiment may include a directional control of the azimuth angle and elevation angle of the transmit antenna. For example, the antenna 115 may have a directional control shown generally as 116. The directional control 116 may be a mechanical movement device, or may use phased array type techniques. Operation of the directional control steers the direction 117 of the maximum output magnetic field of the antenna—sometimes called the "main lobe" of field intensity.

The direction device may be a pan and tilt gimbal having vertical and horizontal axes allowing adjustment of the azimuth and elevation angles. A first device may control movement around the vertical axis, and a second device may control movement relative to the horizontal axis. The rotations can be manually controlled, or can be carried out based on an automatic or semi-automatic movement utilizing electrical, hydraulic, pneumatic or other movement devices, in which case the devices may be, for example, electrically-controlled motors or actuators.

The controller 160 also produces an output signal 161 that is used for feedback. Different techniques of feeding back the information can be used as described herein.

According to a first embodiment, the transmitting antenna 115 may be scanned across various ranges of parameters either during the power transmission or prior to transmission. When a powered device 170 itself includes a battery 171, power from that battery can be used during this time of scanning. It is preferable that this battery be a rechargeable battery (e.g. a secondary battery). The scanning can therefore cause temporary interruptions in power to the powered device 170, but the device may continue to operate from the power in the battery 171. The scanning may improve the power coupling, and may thereafter permit improved power coupling. Therefore, the power can be interrupted at intervals to allow periodic readjustment of the characteristics.

Device 170 may have a capacitor or other energy storage means, instead of or acting in conjunction with the battery 171. Other devices capable of temporarily storing energy, such as a low-loss inductor or an electromechanical flywheel may be used to replace or supplement the battery 171.

In one embodiment, a human operator can manually scan over a range of angles to "sniff" out the optimal parameter setting for maximizing delivered power. A visual display, sound generator, or vibration device may be used to indicate to the person making adjustments the delivered power for different adjustment parameter values. This may be done, for example, when the system is used in a fixed installation, such as a room. Users can adjust the azimuth and elevation of the transmit antenna to maximize the received power transfer, much in the same way that rabbit ears were used for antenna adjustments on television sets several decades ago.

Another embodiment may use electric motors or actuators that are controlled by the controllers. The directional device 116 in this embodiment uses electrical motors or actuators. In this embodiment, the device may first scan along a path defined by a lookup table that has a list of the most likely angles to be optimal. For example, this embodiment may carry out scanning over values that have been previously found to be local maximums or global maximums. Optimization techniques such as linear programming and simplex may be used to determine these local or globally optimum values.

According to another embodiment, the antenna 115 uses phased array techniques. The antenna uses a controlled phase or time delay of a driving waveform to control a phase or time delay of one power-carrying waveform relative to the waveforms of other antennas in the array. This allows changing the directionality and beam width of the magnetic field 125 using electrical adjustments of the amplitude and phase from each antenna. For example, this may also use the magnetic shielding and/or steering techniques to electronically adjust the beam width output. In this technique the beam width and direction can be adjusted to direct a maximum amount of magnetic field to the receiving antenna and to avoid or minimize transmitting magnetic field in undesired directions.

In this embodiment, for example, the feedback signal 161, or a signal derived therefrom, may be communicated back to the transmitter. Different techniques for doing this are discussed herein.

One embodiment may completely shut off or greatly attenuate transmitter power when the feedback signal 161 is not received back, or when analysis indicates via well-known methods of detecting a signal in the presence of "noise" that there is no accurate feedback information. For example, this may stop the power from being transmitted when there is no receiver in place or when the receiver is receiving less than a specified amount of power.

This conveyance of the feedback signal uses a signal or information channel from the receiver 150 back to the transmitter. A number of different techniques may be used to send the feedback information back to the control signal.

According to a first embodiment, the feedback conveyor 162 may itself be connected to the powered device 170. For example, when the powered device is a device whose functional purpose includes transmission of a signal, a logical channel within that powered device can be used to send the information stream. For example when a cell phone is being powered, a logical communication channel within the cell phone can send the information stream. Cell phone handsets, for example, often use a message format that transmits such information from the handset to the mobile base station to identify the handset. Among other uses this allows registering a new handset or "attaching" it to the cellular network.

A new information element can be added to the other information elements as part of the wireless powering system design. For example, when the powered device is integral with the receiver 150, the connection 163 may connect to a special logical or physical channel within the powered device to allow transmission back to the power transmitter. In this embodiment, a report indicative of amount (or other characteristics) of received power (for example, estimated signal to noise ratio) can be sent back to the controller 105 using minor modifications of existing cellular messaging techniques. For example, a new message type can be defined and used, via software changes, in the fast associated channel (FACCH) or the slow associated channel (SACCH) of GSM cellular.

Another embodiment may send a feedback signal from the feedback unit 162 directly to a receiver 119 within the transmission device. In the embodiment, the power transmission may only be feasible over a limited length of distances such as 3 to 6 meters (10 to 20 feet). Various existing or future low-power techniques such as Bluetooth can also be used to wirelessly transmit over this short distance.

Another embodiment may transmit over a non-RF channel, such as using an acoustic, infrared, or ultrasonic signal. The hardware could use acoustic transducers—microphone; IR diode source and receiver, etc. Infrared and ultraviolet techniques may also be used since this is over short distances.

Another embodiment disclosed herein uses the controller 105 to match to the resonant frequencies of the transmit and receive antennas. Efficiency can be maximized by accurately adjusting parameters such as physical dimensions and use of dielectric or magnetic materials. It is important to maintain precise matching in order to keep the Q of the antenna at a very high level. In a preferred embodiment, the Q of the antenna is designed to be and is to be maintained, for example, over 1000 and preferably even higher. However, the inventors found that even when the components are manufactured to precise dimensions, dielectric or magnetic objects in the near field of the antenna(s) can change the resonant frequency and/or change the Q of the coil. In an embodiment, dynamic adjustment of these values is carried out. The dynamic adjustment may cause increases or decreases in the sensitivity of controllers or the number and type of control devices for the system.

In an embodiment, the waveform delivered from the control unit 105 to the antenna 110/115 may be adjusted. The control unit 105 may interact with an oscillator 106 which may be electrically adjustable with regard to several parameters: frequency and/or amplitude and/or phase. This may use for example a variable inductor or variable capacitor such as a varactor, or a combination of fixed and variable components. The adjustment can be controlled by trial and error, for example, to maximize the delivered power amount. As stated, the feedback control may also be automatic and continual.

The oscillator 106 can also be a digital oscillator that creates a digital bit-stream based on a table stored in memory. The digital bit-stream represents a sampled version of a sine wave. In this embodiment, the oscillator may include a digital to analog converter that produces an output representative of an analog sine wave. Reading different information from the table changes the frequency or phase of the transmission accordingly.

This may be combined with a heterodyne style up converters such that the variable frequency sine wave is generated at a relatively low nominal frequency. For example, the sine wave may be generated at 100 kHz, and then "mixed" with a constant frequency sine wave of 1300 kHz, for example. This, together with a well known use of a filter or cancellation mechanism to suppress the undesired "image frequency" at 1200 kHz, could create a waveform at nominally 1400 kHz as the output of the up converter. This 1400 kHz waveform will imitate any change in amplitude, frequency or phase that occur in the 100 kHz waveform. This 1400 kHz wave can be further amplified and used to produce the magnetic field transmission.

The above part of this disclosure describes modulating the amplitude and/or frequency and/or phase of the power transmitter signal. Adjustments in these same parameters at the power receiver can be done by modifying the parameters of the components such as the inductance of coils, or the capacitance of capacitors via changes in their mechanical shape or spacing.

Varactors are well-known semiconductor dielectric devices that can be used to change their small-signal capacitance by purely electrical means. The values of so called "parasitic" or intentional parameters can be modified by introducing or moving dielectric or magnetic objects in the vicinity of the antenna.

Individual adjustment of the resonant frequency of each receiver is a preferred embodiment when using multiple receive devices that accept power from a single transmitter. It is also possible alternatively to use one transmit antenna for feeding several transmit power waveforms, each having distinct frequency and phase, with all of them being produced by the same or multiple frequency transmitter(s), as an alternative to use of multiple separate discrete transmitters.

In the embodiment, the feedback 162 may be used to provide information from which a frequency can be adjusted. The transmit frequency in an embodiment can be continually adjusted.

Another embodiment may control and match phase in addition to matching the frequency. The phase adjustment may become even more important when there are multiple signal sources, each arriving at the receiver. The phase adjustment may be carried out by adjusting the phase or time delay of the sine waves. For example, a sine wave and cosine wave of the same frequency can be created and added together with each wave amplitude adjustable value components such as adjustable resistors, inductors or capacitors may also be used to create a phase shifted sine wave. This system may also, however, change the amplitude of the resultant wave, and as such may be compensated by use of an adjustable amplifier.

Polarization matching can also be used to optimize efficiency. In a preferred embodiment primarily using magnetic fields, such fields are customarily described by a vector (symbol B or H), to indicate the intensity and direction of that field. Another embodiment may in contrast primarily use an electric field, where the vector E represents the intensity and direction of the field. For the structures considered in this document, the two vectors B and H will always be locally parallel to each other and may be thought of as two representations of the same magnetic field expressed in different units, namely amp/meter for H and volt·second/meter$^2$, or Teslas, for B.

Linear polarization can be matched in a first embodiment. The optimal polarization in a magnetic power transfer system is to orient the B (or H) field in and around the receiver antenna coils, so the B field is perpendicular to the geometric plane of the receive coils. In the case of a design in which not all coil turns lie in the same or parallel planes, an "average" or "effective" or "composite" single plane can be determined via well-known methods of calculation or measurement. In contrast, in a power transfer system primarily using the electric or electromagnetic fields, the receive antenna has a composite or equivalent vector polarization, and the maximum power will be transferred when the local electric field vector E of the power transmission wave is parallel to that receive antenna polarization vector. For a multiple element antenna there is likewise a "composite" overall polarization vector, and maximum power transfer occurs when the vector E field is parallel to it.

In another embodiment, there are multiple transmitting antennas, and hence waves may arrive from multiple transmitting antennas or from different parts of a transmitting antenna array. These waves may have the same frequency but arrive with different E, B (and H) field directionalities. When different parts have different directionalities, the combination of these waves may form a circular or elliptically polarized wave.

The elliptically polarized wave is considered as a more general case, and is hence considered herein. The instantaneous E and B fields' polarization of such a wave appears to rotate in space. The tip of the E field vector, if it were visible to an observer, appears to trace out an ellipse during each cycle of the rf oscillation. The B field also appears to trace out an ellipse of its own in space. For such an elliptically polarized wave, maximum magnetic field power delivery occurs when the major axis of the B field ellipse is perpendicular to the effective plane of the receiving antenna coil, or for the electric field case, when the major axis of the E field ellipse is parallel to the polarization vector of the receive antenna.

Hence, for both these cases optimal power delivery occurs when an axis of the ellipse is perpendicular to the plane of the coil The E and B fields can be oriented using two or more transmit antenna coils, each of which is oriented such that the center line axes of these coils are mutually perpendicular. Using 2 coils allows the direction of the E field to be adjusted to any desired orientation within a plane. A different number of coils can also be used. For example, three coils can be used to adjust to any desired orientation in three-dimensional space. Any desired electromagnetic wave of any desired spatial orientation can be produced by three mutually perpendicular transmit coils, each driven with a sinusoidal current of the same frequency.

For those embodiments where the optimal location or direction of the main lobe of the radiated power and the optimal polarization of the wave may change with time, the feedback control system is designed to achieve the results described in the previous paragraphs. These changes may be due to, for example, movement of the device that receives the power and its associated antenna coil. Linear programming or other well known methods of optimization can be used in the design of the feedback control system to carry this out.

Another embodiment may transmit power over radio frequencies. A substantially un-modulated sine carrier frequency waveform may be used along with other waves that include carrier frequencies used for communication. For example, in one embodiment, a carrier frequency different and distinct from the power transmission frequency may be used to send information such as feedback information.

The power and signaling frequencies can be any value; however use of lower radio frequencies has several advantages, including these:

Larger transmit power (and thus larger Receiver power delivered) are permissible at lower frequencies under FCC, CRTC-DOC and EU limits on rf exposure, without the risk of harm to people in the vicinity.

The electrical "skin depth" of surface electric currents on conductors, such as the antenna coil, is greater at low frequency, so that the effective electric resistance of these conductors is lower and the Q and efficiency are greater.

The near field region around an antenna is larger at low frequencies, thus providing a possibility of greater power delivery distance with high power delivery.

Techniques are used to avoid or minimize interference with communication receivers nominally using the same frequency.

In contrast to a modulated radio waveform having a non-zero bandwidth, the single frequency, nominally zero-bandwidth, power transmission sine wave can be advantageously used, via the methods described here, on frequencies that also carry communication signals, without significant degradation of said communication signals. Several types of widely used modulation on the communication channel are suitable for this purpose. Slightly different methods are used for two categories of interference minimization. At the time of filing, these methods are not specifically approved by government regulatory agencies, who currently prohibit any type of radio signal except as licensed, in most radio bands. Changes in the relevant regulations might be necessary for legal operation on licensed radio communication bands using the methods described here.

This system may also limit the size region of possible Interference. The substantially un-modulated rf power carrier sine wave used in these embodiments is transmitted in a directional beam and is intended to be severely attenuated in the transmission beam, at greater distances than a few meters. Therefore, the possibility of interference with a communication receiver is significant only in a relatively small region of space near the power receiver and power transmitter antennas, and not over the entire area of a city as for broadcast interference.

Other techniques can be used to minimize or avoid interference with modulated signals occupying the same part of the radio spectrum. One method involves setting the power RF frequency almost or precisely equal to the communication carrier frequency (for some types of modulation, this is the zero-deviation frequency of the communication carrier). This placement of a second carrier frequency is seldom if ever used in prior art radio system design, because of the widely held belief that intentionally transmitting any waveform within the frequency spectrum already occupied by a modulated communication signal will always cause degradation of the communication signal. In an alternative method, the power carrier frequency is intentionally set sufficiently far above or below the communications carrier frequency so as to be substantially outside of the nominal communication signal bandwidth, and therefore "filtered out" by the communication signal receiver. This latter method might be used only after a prior test of the first method and also if it outperforms the first method.

The method for a particular installation is selected based on the type of modulation used on the communication carrier in the vicinity and the power level of the communication signal at the communication receiver antenna, and the results of modified SINAD tests. SINAD is an abbreviation of signal, interference, noise and distortion. The modified SINAD test procedure is described later. Thus the power settings and adjustments may be different in different specific installations. These settings and adjustments may be accomplished by manual means at installation or repair time, or they may be automatically controlled by an automatic feedback control loop including a monitoring communications receiver to measure the amount of interference. The monitoring communications receiver may be the very same communications receiver used by the rf power carrier user(s), or it may be a distinct receiver.

Different categories of modulation can be separated regarding their performance in the presence of noise or interference. Some types of modulation are characterized by means of a parameter called its "capture ratio." Modulation methods in this category typically do not have a carrier or other fixed frequency component when an input signal is varying. Examples in this category include FM (frequency modulation), PM (phase modulation) and QAM (combined phase and amplitude modulation—called quadrature amplitude modulation).

The capture ratio is a special value of the SNR, the ratio of signal power (including noise) to the sum of noise and interference power (SNR=(s+n)/(n+i)) which is the boundary value for SNR, separating a range that allows almost perfect reception for all SNR values above this boundary value, in contrast to degraded reception quality for all SNR values below this, but it applies only to certain types of modulation.

An objective of a radio communication system designer using a capture-ratio type of modulation is, in view of expected noise and interference, to place and assign parameter values such as Transmitter power, antenna gain, path loss, etc., to each communication link so that the SNR is above the capture ratio. An object of this invention is to keep the total rf noise and interference at the power Receiver antenna low enough so that the SNR is still above the capture ratio when the power Transmitter is operating. In this process, the power rf carrier is treated as an element of the noise and interference—in some installations it may be the largest single noise in the mix of naturally occurring background noise and interference.

The capture ratio depends on the precise type of rf modulation, the bandwidth of the rf signal and the bandwidth (or bit rate, if digital) of the baseband modulating input signal and the severity of fast fading due to movement of either or both of the transmitter or receiver in a multipath radio environment. For example, for the type of analog FM radio used historically with North American cellular (sometimes called AMPS), the capture ratio is approximately 63/1. This ratio is also frequently expressed as 18 dB, an equivalent expression. If the same input signal is used but the designed FM frequency deviation (and thus the rf bandwidth) decreases, the capture ratio increases, indicating that a higher SNR is required on each communication link for a low deviation FM signal. The underlying theory to explain this is well known There are several methods used in the art to characterize the accuracy or fidelity of the reception of a radio signal. A widely accepted test is the SINAD test. A modified SINAD test, useful for testing and installing the present invention, is summarized in the following paragraphs as an example used to illustrate the kinds of techniques that can be used when minimization of the degradation of a nominally "same frequency" communications signal is an objective.

With the communications receiver operating with a known baseband test signal, the rf power signal can first be set at a frequency that is the nominal center frequency of the communication signal, a frequency corresponding to zero deviation (analog audio silence) for an analog FM signal. The maximum power level of the power carrier at the location of the communication receive antenna is determined by starting a transmit test at a low power level and then increase, at a controlled rate, the power-carrier power, until a pre-specified level of baseband "signal to noise" ratio occurs.

For example, a known baseband waveform is transmitted on the communication channel for test purposes, and a properly time-synchronized "clean" replica of that test waveform is adjusted to match the amplitude of the received baseband waveform, which is subtracted from the time-synchronized test waveform. This difference signal is defined as the baseband noise, n. The power content n is measured and compared to the baseband received signal output power s. The power carrier level is gradually increased. When the ratio of baseband signal to baseband noise exceeds the pre-specified SINAD value of, for example, 16/1 (also expressed as 12 dB) the corresponding rf interference level (which includes the power carrier) is at the maximum allowable level for that particular installation.

This embodiment of the measurement method deviates from traditional SINAD measurements. In traditional SINAD, the baseband signal is a sine wave audio frequency waveform, while in an embodiment, we can use any test waveform, including a digital waveform or square wave. Also, in the traditional SINAD test, the method of separating the "difference" signal (which comprises the effects of noise, interference and distortion) is to extract the audio sine wave by means of a standard narrow-band "notch" (single frequency reject) filter, which only works with an audio frequency baseband test sine wave. Again, our embodiments can use any baseband test waveform.

Incidentally, baseband power described above as s is the "sum" (combined effects) of the desired signal power, together with the undesired noise, interference and distortion; and n is the "sum" of noise, interference and distortion. The composite signal plus noise and interference is used in the numerator of these expressions simply because it is simpler to not attempt to remove the noise and interference from the s term; just a matter of convenience. Distortion could be represented by an additional term in the formula, but is usually discussed in the text but not symbolized in the formula in most literature in this subject area. These statements apply to both the traditional SINAD test and our modification as well.

As background information, we note that the results of our test will typically have a qualitative difference when comparing "capture ratio" types of modulation with AM family modulation. In the former case the "audio quality" of FM. For example, baseband (s/(n+i) "suddenly" becomes 1000 to one, or 30 dB) when the rf S/(N+I) exceeds the "capture ratio" appropriate for that signal. Baseband (s/(n+i) is only degraded when the rf S/(N+I) falls below the capture ratio.

In contrast, any of the AM family of signals, for example, broadcast AM, has no defined "capture ratio," and the audio baseband (s/(n+i) value substantially "tracks" (is proportional to) the rf S/(N+I).

The use of 12 dB as a deciding value for baseband waveform in our test example is an existing industry standard for a traditional SINAD test for a baseband power analog FM mobile radio. Audio with a 12 dB signal to noise ratio sounds subjectively quite good for voice conversations, so the choice is not totally arbitrary. For digital communication channels, an appropriate maximum permissible bit error rate (BER), for example 2% erroneous bits with 98% accurate bits, can be used as a criterion, instead of baseband (s/(n+i), to determine when the interference from the power carrier is excessive. The maximum bit error rate must be commensurate with the amount and type of error protection code designed for and used on that digital channel. In the previous example, intrinsic error protection coding can function correctly in the face of a 2% bit error rate. To find the errors, our method of transmitting a known digital waveform may be used, but there are other methods of error bit counting as well. In some types of digital channels, for example digital cellular radio, error protection codes are already used as a part of the communication process protocol, and they can be used by our power transmission system to estimate the bit error rate on the communication channel. Such methods for estimating the bit error rate or word error rate by means of evaluating byproduct data arising from operation of error protection codes that are already an intrinsic part of the communications protocol of a channel are well known to those skilled in the art and are already used in digital cellular radio systems.

When an adequate communication receiver signal accuracy cannot be achieved simultaneously with delivery of rf power to the power Receiver while the power carrier frequency is set at the nominal center frequency of the communication channel, the more customary alternative of setting the power carrier frequency to the edge of the communication signal rf bandwidth (or even further from the center frequency) is still available to the installer.

Many modern communication and broadcast radio receivers already include a design feature called automatic gain control (AGC). AGC uses an automatic feedback control loop to dynamically adjust the gain (amplification) of typically the first (rf pre-amplifier) stages that amplify the receiver antenna signals. The purpose of this adjustment is to eventually have all signals from either high power vs. low power level transmitters, or nearby transmitters vs. distant transmitters (as measured at the Receiver antenna) arrive at the internal detector/discriminator all at a uniform amplitude or power level. This simplifies the design and improves the performance of the detector/discriminator and also means that when an excessive amount of power rf carrier occurs, as measured at the communications receiver antenna, that will cause the audio or baseband digital output signal to become smaller in amplitude (quieter in the case of analog FM or analog AM or SSB). SSB is described later.

Communication signals that are members of the so-called AM (amplitude modulation) "family" of modulation techniques use one or two "sidebands" (radio frequency "copies" of the analog input baseband waveform, with the frequency order inverted for one of the two sidebands only) together with a constant amplitude, constant frequency rf carrier sine wave arising at the Receiver in one of two design choices. In one design choice, the carrier frequency waveform is either transmitted from the communications Transmitter to the communications Receiver via the radio wave (called "carrier present"), along with the so-called "sideband(s)." In the second alternative design choice, the carrier is not sent via radio from the communications Transmitter but is generated locally at the communications Receiver and combined with the sidebands there (called "carrier absent"). Ordinary broadcast AM (in the frequency range 600 kHz to 1.6 MHz) is called DSB-AM (double sideband AM) since the broadcasting Transmitter sends the carrier and both sidebands. Analog television broadcasting of the picture (sound is sent via FM) occurs via a modified single side band (SSB) carrier present radio signal called vestigial SSB. Military and amateur radio operators use "pure" SSB; that is, one sideband present with the carrier absent. This last method uses a local oscillator in the communications receiver (called the beat frequency oscillator—BFO) to provide the necessary carrier at the demodulator. In some communication receivers, the BFO frequency (and amplitude) is adjusted manually.

In a carrier present system, if the frequency of the BFO oscillator is not close enough to the needed frequency, the audio output will contain an audio tone at the "difference" frequency $fd=|fc-fb|$ (also called the beat frequency or audio heterodyne frequency), where fc is the carrier frequency and fb is the BFO frequency and the vertical bars surrounding the two frequency symbols represents the absolute value. In a carrier absent system, the two sidebands will be detected by a receiver with an erroneous value of fb but will appear at the output of the detector as a frequency shifted replica of the original sideband waveform. The amount of frequency shift will be fd in magnitude and the direction of frequency shift will be up or down according to whether fb is lower or higher than fc and also is opposite for each sideband. In short, if fd differs substantially from zero, the received communication output waveform will be significantly distorted.

In a practical system, the value of fd should be small enough such that the resulting detected communications waveform is close enough to its desired undistorted form so that the intended purpose of the radio communication can be achieved. In the case of ordinary speech, the detector output wave need not match the original input speech waveform so precisely, but the audio power spectrum of the output baseband signal must be sufficiently close to that of the original input voice signal. Experience has shown that an approximate value of fd <300 Hz is acceptable. For other applications, or carriage of other waveforms, such as for example a modem signal comprising an audio frequency FSK signal, a still smaller value of fd will typically be mandatory. In each such case one of ordinary skill can determine the correct value for fd by searching the scientific literature, by simple measurements, or via simple calculations. For example, if the audio frequency accuracy of the modem sine wave generator is ±15 Hz, and the bandwidth within which the detector filters can recognize an audio frequency corresponding to a binary 1 or 0 is ±25 Hz, then it is clear that the maximum value of fd is ±10 Hz.

To summarize, designers historically purposely avoid placing an interfering signal over a communication signal, but we do the opposite. The invention described in the present application does this when the "interfering" signal (our power carrier sinewave) is not modulated.

An embodiment makes use of a unique modification of the traditional SINAD test. Our modification versatile, and is adaptable to testing digital channels, while traditional SINAD is only usable for analog waveforms.

An embodiment uses a feedback control loop to control the frequency and/or amplitude of a potentially/possibly interfering zero-bandwidth (substantially un-modulated) radio source (that is, the power transmitter).

Any of the above techniques, even if disclosed for use with RF, can also be used with magnetic techniques, e.g., by using the RF produced according to these techniques to feed an electromagnetic field power coupling device.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other antennas and movement or orientation methods can be used.

Also, the inventors intend that only those claims which use the words "means for . . . " are intended to be interpreted under 35 USC 112, sixth paragraph. Moreover, no limitations from the specification are intended to be read into any claims, unless those limitations are expressly included in the claims. The operations described herein may be controlled by any kind of computer, either general purpose, or some specific purpose computer such as a workstation. The computer may also be a handheld computer, such as a PDA, cellphone, or laptop or a controller.

Where a specific numerical value is mentioned herein, it should be considered that the value may be increased or decreased by approximately 20%, while still staying within the teachings of the present application, unless some different range is specifically mentioned. Where a specified logical sense is used, the opposite logical sense is also intended to be encompassed.

What is claimed is:

1. A near-field magnetic power coupling system, comprising:
   a receiver configured to receive power from a near-field magnetic field generated by a transmitting antenna of a transmitter that conveys power in the magnetic field via a power coupling between the receiver and the transmitter; and
   a circuit configured to supply the power received by the receiver to a load, the receiver further configured to generate and transmit a feedback signal to the transmitter, the feedback signal representing at least one characteristic of the power coupling, and the feedback signal including at least information representative of an intensity of the near-field magnetic field, and the receiver further configured to sense a change in the at least one characteristic of the power coupling that is produced by a change of at least one physical parameter of the transmitter in response to the feedback signal.

2. The system of claim 1, further comprising the transmitter, wherein the transmitter changes a characteristic of the power coupling based on the feedback signal.

3. The system of claim 2, wherein the transmitter changes a directionality of the field.

4. The system of claim 2, wherein the magnetic field is concentrated, and wherein the receiver is positioned relative to the transmitter to receive power from the concentrated the near-field magnetic field in the immediate neighborhood and interior to an antenna of the receiver.

5. The system of claim 1, wherein the transmitter is configured to change a characteristic of the power coupling in response to the feedback signal.

6. The system of claim 1, wherein charging at least one physical property of the transmitter comprises changing a position of an antenna.

7. The system of claim 1, wherein charging at least one physical property of the transmitter comprises controlling a direction of the near-field magnetic field created by the antenna without physically moving or reorienting the antenna.

8. The system of claim 1, wherein the feedback signal is sent from the receiver to the transmitter via a short range communication technology.

9. The system of claim 8, wherein the short range technology is an infrared channel.

10. The system of claim 1, wherein the feedback signal is sent from the receiver to the transmitter via a cell phone communication channel.

11. The system of claim 1, wherein the transmitter is configured to adjust a resonant frequency of the transmitter in response to the feedback signal.

12. The system of claim 1, wherein the transmitter is configured to adjust an operating frequency of the transmitter in response to the feedback signal.

13. The system of claim 1, wherein the receiver is further configured to sense a change in at least one characteristic of the power coupling produced by a change of at least one parameter of the transmitted signal in response to the feedback signal.

14. A near-field magnetic power coupling system comprising:
a transmitter that receives electric power from a power source to be transmitted to a receiver, and couples the power to the receiver by creating a near-field magnetic field within a field of a transmitting antenna; and
a receiving part that receives a signal from the receiver indicative of a feedback control, the signal including at least information representative of an intensity of the near-field magnetic field, the transmitter further configured to change a characteristic of the created near-field magnetic field based on the signal indicative of the feedback control to increase power transmission efficiency.

15. The system of claim 14, wherein the transmitter changes the way the power is transmitted in response to the signal indicative of the feedback control.

16. The system of claim 15, wherein changing the way the power is transmitted comprises changing a position of the transmitting antenna.

17. The system of claim 15, wherein changing the way that the power is transmitted comprises controlling a direction of the near-field magnetic field created by the transmitting antenna without moving or reorienting the transmitting antenna.

18. The system of claim 15, wherein the signal indicative of the feedback control from the receiver is received via a short range channel technology.

19. The system of claim 15, wherein the signal indicative of the feedback control from the receiver is received via a cell phone communication channel.

20. The system of claim 18, wherein the short range technology is an infrared channel.

21. The system of claim 15, wherein the transmitter changes a resonant frequency of the transmitter based on the signal indicative of the feedback control.

22. The system of claim 15, wherein the transmitter changes the driving signal that sets a frequency of the magnetic field.

23. The system of claim 22, wherein the transmitter changes the driving signal that sets the frequency of the magnetic field by using a digital bitstream to approximate a sine wave based on the digital bitstream.

24. The system of claim 23, wherein the sine wave has an adjustable frequency that changes depending on the specific bitstream which is used.

25. The system of claim 24, further comprising a heterodyne signal that adds a constant frequency to a frequency of the approximated sine wave.

26. The system of claim 15, wherein changing the way the power is transmitted comprises changing a frequency.

27. The system of claim 15, wherein changing the way the power is transmitted comprises changing a component of a polarization.

28. The system of claim 27, wherein the polarization causes the field to impinge on the transmitting antenna at a specified orientation.

29. A method for transmitting power, comprising:
creating a near-field magnetic field within a field of a transmitting antenna to be coupled to a load, the load including a receiver;
detecting if the load is present, and if so coupling the near-field magnetic field to the load so as to produce power for transmission to the load;
receiving a feedback signal from the receiver, the feedback signal including at least information representative of an intensity of the near-field magnetic field;
adjusting a physical parameter of the transmitting antenna to increase power transmission efficiency based at least in part on the feedback signal; and
shutting off or hibernating transmission upon detecting removal of the load from the field.

30. A method for transmitting power, comprising:
receiving electric power from a power source;
coupling the power to a receiver magnetically by creating a near-field magnetic field within a field of a transmitting antenna;
receiving a feedback control signal including at least information representative of an intensity of the near-field magnetic field, the signal being transmitted from the receiver; and
changing a characteristic of the created near-field magnetic field based on the feedback control signal.

31. The method of claim 30, wherein changing a characteristic of the created magnetic field comprises changing a position of the transmitting antenna.

32. The method of claim 30, wherein changing a characteristic of the created magnetic field comprises controlling a direction of the near-field magnetic field created by the transmitting antenna without moving or reorienting the transmitting antenna.

33. A method for transferring power, comprising:
generating from electric power a near-field magnetic field that is capable of conveying power from a first location, where the electric power is used, to a second location within a field of a transmitting antenna, the antenna being remote from the first location;
receiving the magnetic field in a receiver that is remote from a source of the electric power and that is not connected thereto by an electric wire, and producing an electrical output signal based on the near-field magnetic field;
receiving a feedback control signal including at least information representative of a concentration of the near-field magnetic field in the receiver, the signal being transmitted from the receiver; and
based on the feedback control signal, changing a characteristic of the created near-field magnetic field.

34. An apparatus for transmitting power, comprising:
means for receiving electric power from a power source, means for coupling the power to a remote receiver magnetically by creating a near-field magnetic field within a field of the means for coupling;
means for receiving a feedback control signal including at least information representative of a concentration of the near-field magnetic field, the signal being transmitted from the remote receiver; and means for changing a characteristic of the created near-field magnetic field based on the feedback control signal.

35. The apparatus of claim 34, wherein the means for receiving electric power comprises a plug, wherein the means for coupling comprises an antenna, wherein the means for receiving a feedback control signal comprises a receiver unit, and wherein the means for changing comprises a control unit.

36. The apparatus of claim 35, wherein the means for changing a characteristic of the created near-field magnetic field comprises means for changing a position of the transmitting antenna.

37. The apparatus of claim 35, wherein the means for changing a characteristic of the created near-field magnetic field comprises means for controlling a direction of the near-field magnetic field created by the transmitting antenna without moving or reorienting the transmitting antenna.

38. A method for receiving power comprising:

receiving power at a receiver from a near-field magnetic field generated by a transmitting antenna of a transmitter that conveys power in the near-field magnetic field;

supplying the power received at the receiver to a load;

transmitting a feedback signal to the transmitter, the feedback signal including at least information representative of an intensity of the near-field magnetic field; and sensing a change in at least one characteristic of the power coupling between the transmitter and the receiver produced by a change of at least one physical parameter of the transmitter in response to the feedback signal.

39. An apparatus for receiving power comprising:

means for receiving power from a near-field magnetic field generated by a transmitting antenna of a transmitter that conveys power in the near-field magnetic field;

means for supplying the power received to a load;

means for transmitting a feedback signal to the transmitter, the feedback signal including at least information representative of an intensity of the near-field magnetic field; and means for sensing a change in at least one characteristic of the power transmission from the transmitter produced by a change of at least one physical parameter of the transmitter in response to the feedback signal.

40. The apparatus of claim 39, wherein the means for receiving power comprises a receive antenna, wherein the means for supplying comprises a receiver controlling circuit, wherein the means for transmitting a feedback signal comprises a feedback conveyor, and wherein the means for sensing comprises the receiver controlling circuit.

* * * * *